June 19, 1951    L. A. RIGGS    2,557,205
PANORAMIC TELESCOPE FOR GUNS
Filed Aug. 26, 1947    5 Sheets-Sheet 1

Inventor
LORRIN A. RIGGS

June 19, 1951   L. A. RIGGS   2,557,205
PANORAMIC TELESCOPE FOR GUNS
Filed Aug. 26, 1947   5 Sheets-Sheet 2

Inventor
LORRIN A. RIGGS

June 19, 1951          L. A. RIGGS          2,557,205
PANORAMIC TELESCOPE FOR GUNS Filed Aug. 26, 1947          5 Sheets-Sheet 3

Inventor
LORRIN A. RIGGS

Inventor
LORRIN A. RIGGS

June 19, 1951  L. A. RIGGS  2,557,205
PANORAMIC TELESCOPE FOR GUNS
Filed Aug. 26, 1947  5 Sheets-Sheet 5

Inventor
LORRIN A. RIGGS

Patented June 19, 1951

2,557,205

UNITED STATES PATENT OFFICE

2,557,205

PANORAMIC TELESCOPE FOR GUNS

Lorrin A. Riggs, Providence, R. I., assignor to the United States of America as represented by the Secretary of War Application August 26, 1947, Serial No. 770,681

11 Claims. (Cl. 33—48)

This invention relates to telescopes, more particularly, to panoramic telescopes constructed for military use to control the fire of guns. A representative type of such a telescope is the Army's M12. This telescope comprises in general, an elbow and eyepiece assembly, a shank assembly, an azimuth mechanism assembly and a rotating head assembly. The aforesaid head assembly is mounted upon the azimuth assembly for rotation about a normally vertical axis. Rotation is effected by an azimuth knob fixed to one end of a shaft journaled in the azimuth housing. This shaft also carries a worm, in mesh with a gear having 64 teeth and fixed to the head for rotation therewith.

A cylindrical azimuth scale attached to the head for rotation therewith is graduated in steps of 100 mils and is readable against an index fixed to the azimuth housing. Each rotation of the shaft therefore rotates the head through 100 mils.

In order to effect readings to the nearest mil, the other end of the aforesaid worm shaft is provided with a cylindrical azimuth micrometer scale graduated in 100 equal divisions and readable against a deflection index. The aforesaid azimuth scale is graduated in 100 mil units, as previously stated, and when finer adjustment, as to the nearest mil, is required, the azimuth micrometer scale is employed. Thus should an adjustment of the line of sight be required of 1675 mils to the right, the azimuth knob is rotated until the azimuth scale number "16" is opposite the azimuth index. Attention is then transferred to the azimuth micrometer and the knob is given a further rotation until the "75" graduation on the azimuth micrometer scale is opposite the index.

It has been found in practice that under the stress of firing, erroneous azimuth settings are frequently made which appear to be inherent in the use of two separate and distinct scale readings, namely, a gross scale reading in steps of 100 mils and a fine scale reading in steps of 1 mil between 0 and 100. For example, when the gross or azimuth scale reads very nearly "15" and the fine or micrometer scale is, say, "98", the correct azimuth is "1498". Instead, however, this is often read "1598" thus introducing an error of 100 mils in the plane of fire. When there is considered the large distance subtended by an angle of 100 mils at ordinary firing ranges of several miles, the possible serious consequences, such as firing into friendly troops, is obvious.

It is the general purpose of this invention to provide a panoramic or other type gun sighting telescope wherein the aforementioned possibilities of error are eliminated and rendered impossible.

More specifically, it is a purpose of the invention to provide a panoramic sight of the type described wherein the azimuth setting to the nearest mil is indicated by a single and unmistakable number, no other numerals being visible or possible of reading.

A further object is to provide an azimuth indicator in a panoramic telescope wherein the azimuth indication for each setting of the sight, is given, to the nearest mil, by a series of adjacent counter wheels or drums marked to permit but one numeral of each wheel to be read.

A still further object is to provide a combination of a panoramic gun sight and counter means wherein azimuth setting is clearly and unmistakably numerically indicated.

Another object is to provide a type of rotation counter specially adapted for cooperation with the conventional mil system of azimuth laying of guns.

Other objects and advantages will be obvious from a study of the following specification.

Figure 1:
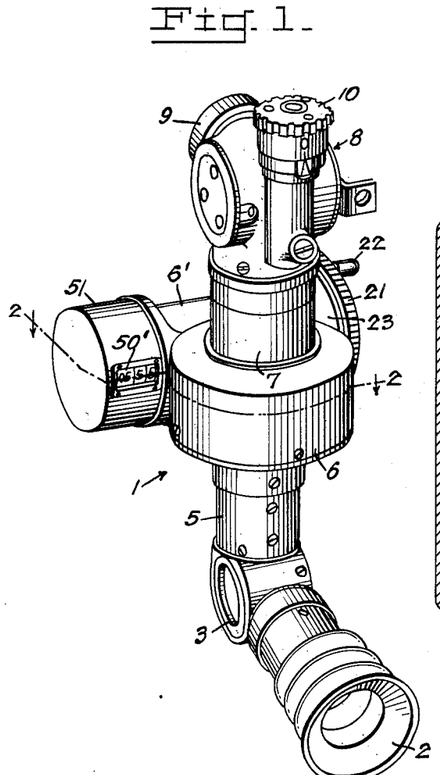
Figure 1 is a perspective view of an Army type M12 panoramic telescope equipped with my invention.

Referring in detail to the drawings, and particularly to Figure 1, 1 identifies generally a panoramic telescope of the Army's type M12 adapted to be connected with a gun by any suitable telescope mount. The telescope includes an eyepiece or ocular 2 mounted upon the normally horizontal end portion of an elbow assembly 3. This assembly includes a 90° reflecting prism by which the light rays proceeding through objective 9 and downwardly through the vertical portion of the tube, are reflected rearwardly into eyepiece 2. The elbow assembly 3 has a normally vertical portion projecting upwardly into and rigidly secured to the cylindrical sleeve 5 of the azimuth assembly. This assembly includes an enlarged frame or housing 6 surmounted by a coaxial sleeve 7. The parts 2 to 7, inclusive, are all fixedly related and constitute an assembly which is normally fixed to the gun mount.

A head assembly, generally identified at 8 includes the objective 9, mounted for limited rotation about a normally horizontal axis in response to turning of a knob 10. This head contains a reflecting prism (not shown) by which the light rays from a remote target entering objective 9, are deflected downwardly through aligned tubes or sleeves 7 and 5 and housing 6, thence to eyepiece 2.

Figure 2:
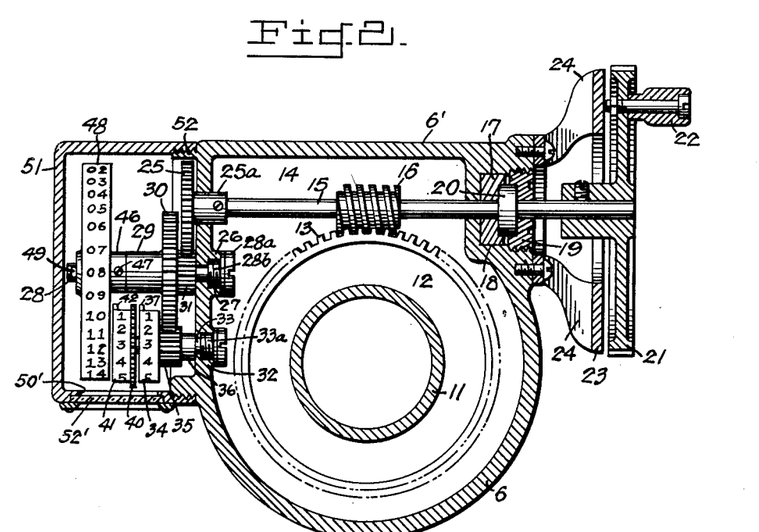
Figure 2 is a horizontal section taken upon a plane indicated by the line 2—2, Figure 1, the register dials and driving gearing being shown in plan.

The head 8 includes an interior shank 11, shown in cross-section in Figure 2 extending downwardly into housing 6 and there provided with a worm gear 12 having 64 teeth, 13, and thus corresponding to 100 mils of azimuth per tooth. The housing 6 has a generally cylindrical offset wall 6' with generally horizontal axis, and providing a chamber 14 for a shaft 15 and worm 16 fixed thereon.

Shaft 15 is journaled at one end in a bearing mounted within a threaded recess 18 formed in the end wall of chamber 14. This bearing may comprise a pair of sleeves 17 and 19 having confronting coaxial recesses receiving a collar 20 therebetween. This collar is fixed to shaft 15. Sleeve 19 threadedly engages the recess 18 and may be adjusted by a spanner to provide a smooth bearing for shaft 15, without end play. The adjacent end of shaft 15 projects exteriorly of housing 6 and is there provided with a small handwheel 21 having a knob 22. Since the parts are of relatively light construction, a guard is provided for handwheel 21, comprising an annulus 23 having substantially the same outer diameter as wheel 21, and mounted closely adjacent to and parallel with the wheel, as by means of bracket arms 24. Thus, as handwheel 21 is turned, gear 12 and the head assembly 8 are correspondingly rotated to move the line of sight in azimuth. It will be understood that the image is kept erect at all times by means of a well-known apparatus including a dove prism mounted vertically within shank 11 and having gearing connections by which the prism is rotated at half the angular speed of rotation of the head assembly.

At its left end, as seen in Figure 2, the shaft 15 is fixed within the axial bore of the hub 25a of a gear 25. The hub has a smooth bearing within an aperture of the wall of housing 6. This wall is also formed with a lug 26 having a threaded counterbore 27. A bearing shaft 28 is formed at one end with a head 28a having an adjacent threaded portion 28b to engage the threads of lug 26.

A composite gear comprises a hub 29 a gear 30 and a pinion 31, journaled on shaft 28. Pinion 31 is in mesh with gear 25. The wall of housing 6 has a second lug 32 having a threaded counterbore to receive the enlarged threaded end 33a of a shaft 33. A units or mils counter wheel or drum 34 has a pinion 35 coaxially fixed therewith. This pinion is in mesh with and is driven by, gear 30. A spacer sleeve 36 is loosely mounted upon shaft 33 to prevent the composite wheel and gear 34, 35 from moving axially inwardly along shaft 33.

The ratio between gear 25 and pinion 35, is 1:10 so that units wheel 34 rotates 10 times for each rotation of shaft 15, worm 16, and handwheel 21. Wheel 34 has equally-spaced numerals 0 to 9, thereon so that it indicates angular movement of the line of sight to the nearest mil. In other words, wheel 34 rotates a total of 640 times for a complete 360° movement in azimuth of the line of sight.

Figure 6:
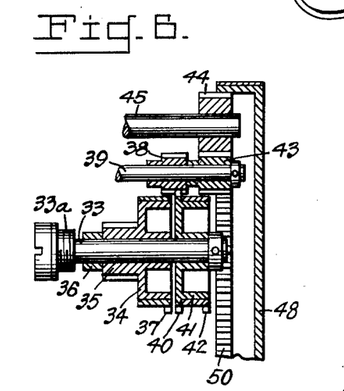
Figure 6 is a section taken approximately on line 6—6, Figure 4 showing the driving connections between the units and tens drum.

Wheel 34 has a single tooth 37 (see Fig. 6) which, on each rotation thereof, engages the teeth of a pinion 38 journaled upon a shaft 39. This shaft may be mounted in and fixed to the wall of casing 6 in the same manner as has previously been described for shafts 28 and 33. Pinion 38 is of sufficient length to extend axially across the path of tooth 37 and to mesh with the teeth of a ring gear 40 fixed to and concentrically of tens wheel or drum 41 journaled upon shaft 33. The arrangement is such that wheel 41 is rotated one-tenth of a rotation each time tooth 37 passes into and out of engagement with pinion 38. Since this wheel has equally-spaced numerals 0 to 9 about its periphery and rotates 64 times for each 360° movement in azimuth of the line of sight, it is effective to indicate tens of mils of angular movement of the line of sight.

Wheel 41 has a tooth 42 on its periphery adapted, on each rotation of the wheel, to engage and turn a pinion 43 journaled on shaft 39 and in mesh with an idler pinion 44 journaled upon a shaft 45. This shaft may be mounted on the wall of casing 6 in the manner previously described for shafts 28 and 33.

Composite gear 29, 30, 31, is held against axial movement in one direction on shaft 28, by the wall of casing 6, and in the other direction by a spacing collar 46 fixed to the shaft by set screw 47. A hundreds wheel 48 is journaled on shaft 28 and is limited in axial movement in one direction by collar 46 and in the other direction by any suitable means such as a pin 49. Wheel 48 is formed with an internal gear 50 in mesh with pinion 44. The gear ratios are such that wheel 48 is advanced 5.625° each time tooth 42 passes into and out of engagement with pinion 43. The periphery of wheel 48 carries equally spaced numerals from 00 to 31 and, because of the gear ratio previously mentioned makes two complete rotations for each 360° of movement in azimuth of the line of sight.

Figure 3:
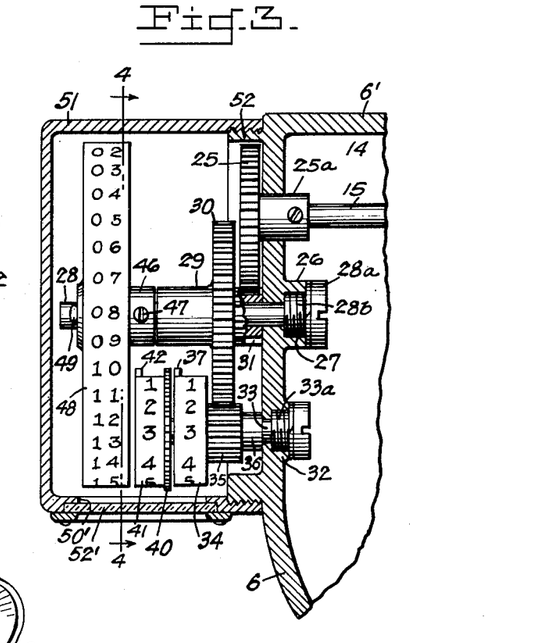
Figure 3 is an enlarged detail sectional view of the arrangement of dial wheels and interconnecting operating mechanism shown in Figure 2, only the housing being shown in section.
Figure 4:
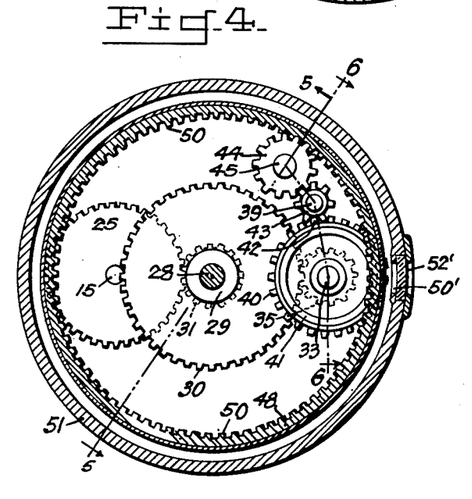
Figure 4 is a sectional elevation taken upon a plane indicated by the line 4—4, Figure 3, and showing the relations of the several shafts by which the counter mechanism is supported and driven, particularly the larger hundreds drum of such counter.
Figure 5:
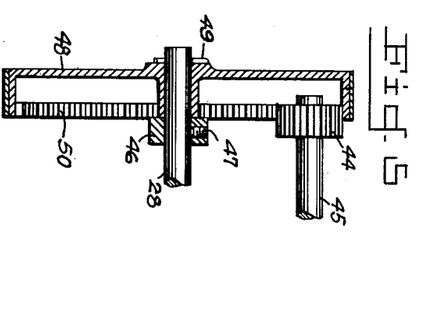
Figure 5 is a section taken upon the line 5—5, Figure 4 and showing the drive to the hundreds drum.

The three register wheels 34, 41 and 48 are mounted so that they are substantially tangent to a common plane at a viewing opening 50' in a cylindrical cover 51 as shown in Fig. 3. A transparent protecting pane 52' may cover opening 50. The cover 51 is conveniently attached to housing 6 by threads on extension wall 52, Figures 2 and 3, and a set screw, not shown.

The parts are so arranged that when the sight is fixed in its mount on the gun, with the line of sight directed forwardly and lying parallel with the normally vertical plane through the axis of the gun bore, the reading of the wheel is 0000. As handwheel 21 is rotated clockwise looking from the right in Figure 2, the line of sight is rotated to the right while the wheels register the movement in advancing numerals to the nearest mil. Continued rotation of the handwheel in the direction aforesaid causes the registered numbers to advance to 3199 when an additional angular movement of 1 mil restores the registration to 0000. At this time the line of sight has been moved clockwise through 180° of azimuth and is directed to the rear in the aforesaid vertical plane. Further rotation of handwheel 21 clockwise, causes the registered numbers to again advance from zero to 3199. Further advance of 1 mil restores the indication to 0000 at which time the line of sight is in its initial position. This is in accordance with standard calibration as employed in panoramic telescopes. In short, clockwise rotation of handwheel 21 corresponds to left deflection, while counterclockwise rotation corresponds to right deflection in the model illustrated.

I have thus provided a panoramic telescope wherein the possibility of erroneous readings has been eliminated. For example, suppose the battery commander orders fire at 1259 mils to the left of the observable aiming point. The handwheel is rotated to move the line of sight to the right until 1259 appears in window 50. The gun and sight are now turned as a unit to the left until the crosshairs in the telescope are on the aiming point, the gun is elevated to the correct angle for the estimated or determined range, and firing is begun. In case firing was ordered at 1259 mils to the right of the aiming point, the handwheel is rotated counterclockwise until the registered number is (3200—1259) or 1941. The gun and sight are then trained as a unit to the right until the crosshairs of the telescope are upon the aiming post or point. Firing is then begun. In the model of Figures 1 through 6 any necessary deflection is set in by additional movement of handwheel 21 until the algebraic sum of the train angle and deflection is registered.

Figures 7, 8, 9:
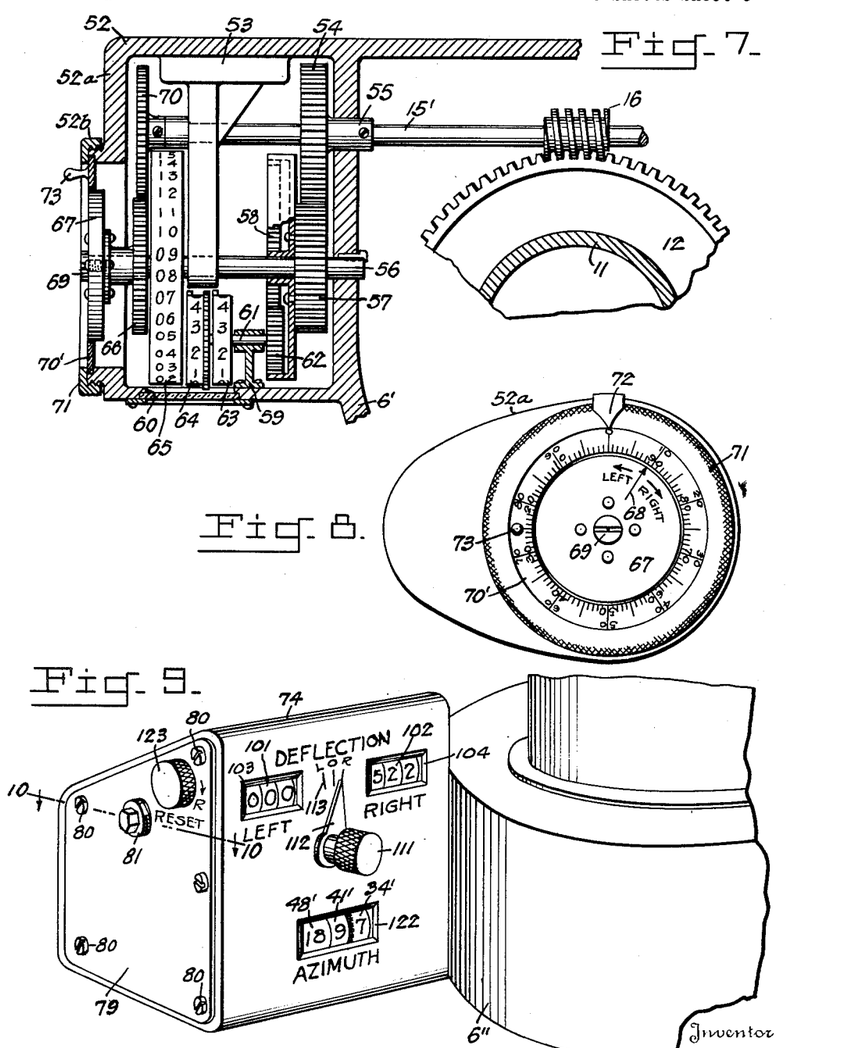
Figure 7 is a view partly in section of a modified form of the invention in which a deflection indicator is provided in addition to an azimuth register.
Figure 8 is an elevational view of the deflection dial and indicator ring of the modification of Figure 7.
Figure 9 is a perspective detail view of a second modification wherein two additional registers are used, one for right deflection and another for left deflection.

At Figures 7 and 8 I have shown a modified form of the invention in which separate deflection indicating means is provided in addition to the azimuth register. In these figures, the frame or housing 6' corresponds generally with housing 6 of Figures 1 to 6, as does shaft 15' to shaft 15. Since the optical elements and azimuth adjusting mechanism may be the same as in those figures, it is unnecessary to show and describe them in detail.

The housing 6' has an extension wall 52 shown as integral with the housing but which may be formed separately and rigidly secured to the housing. A bearing 53 is securely attached to the inner extension wall and has one bearing aperture to journal the extending end of shaft 15'. A second bearing for this shaft is provided by an aperture in the housing wall in which the hub 55 of a gear 54 has a smooth fit. The gear 54 is attached to shaft 15'.

A second shaft 56 passes through aligned apertures in bearing 53 and the adjacent wall of housing 6'. This shaft is preferably fixed in its bearings. A gear 57 is journaled upon shaft 56 and in mesh with gear 54. An internal gear 58 is also journaled on shaft 56 and attached to gear 57. A bearing 59 is secured to the wall 52, adjacent viewing opening 60 and rotatably supports a shaft 61 having a pinion 62 fixed on one end and a units wheel 63 and tens wheel 64 on the other. Pinion 62 meshes with and is driven by the internal gear 58. As in the species of Figures 1–6, the gear ratio is 10:1 so that shaft 61 is rotated 10 times for each rotation of shaft 15'.

As shown, shaft 56 extends to the left of bearing 53 where it journals a hundreds wheel 65. The wheels or drums 63, 64 and 65 are arranged tangent to a common plane adjacent viewing opening 60 and may be duplicates of 34, 41 and 48, respectively, Figure 3, except only that the direction of advancing numerals is reversed. It will be understood that drums 63, 64 and 65 are interconnected as in Figures 1 to 6, so that 64 is advanced $\tfrac{1}{10}$ rotation for each rotation of 63, while 65 is advanced $\tfrac{1}{32}$ rotation for each rotation of 64. It is also contemplated that in a modified form of the invention drum 65 (or 48, Fig. 3) may be graduated from 0 to 63 and be so geared to drum 64 (or 41) as to rotate once for each rotation of the head assembly. The drums 63, 64 and 65 may be connected for timed movement by the same means as have been disclosed for the species of Figures 1–6. It will be understood that any other of the many well known systems may be used for actuating the wheels or drums in timed relation provided only that it acts equally well in each direction and embodies means for positively but yieldingly holding the wheels in adjusted position until moved therefrom by the next adjacent wheel.

The end wall 52a is formed with an outstanding circular rim 52b conveniently threaded exteriorly. This rim is concentric of shaft 56 which projects beyond drum 65 and there journals a composite element comprising a gear and hub 66 and index dial 67 having a radially disposed index 68, Figure 8. A screw 69 prevents the element from outward axial movement on the shaft. Gear 66 meshes with and is driven by, a gear 70 fixed on the projecting end of shaft 15'. Gears 66 and 70 are of equal pitch diameters so that dial 67 rotates at the same angular speed as shaft 15'. Thus both shaft 15' and dial 67 rotate once for each 100 mils of movement in azimuth of the line of sight.

The rim 52b has an internal shoulder within which seats a deflection ring 70'. As shown at Figure 8, this ring is graduated, right and left, in 100 unit or mil graduations, for cooperation with index 68. A knurled clamping ring 71 is threaded on rim 52b and, when turned down, acts to clamp deflection ring 70' to its seat. An index 72 is secured to wall 52a in position for cooperation with the scale upon ring 70'. Adjustment of the ring 70' is facilitated by a knob 73.

The use of this species is generally the same as that of Figures 1–6. When the observed fire appears to require a deflection setting because of windage, target movement, muzzle wear, etc., the necessary deflection, right or left, is transmitted to the gun. The gunner first loosens ring 71 to free ring 70' and, using index 72, rotates ring 70', right or left by an amount equal, to the ordered deflection. Ring 71 is then turned down to clamp ring 70'. The handwheel is next turned to bring index 68 to its position or indication on ring 70' prior to the deflection. The deflection can be eliminated at any time by returning ring 70' to zero with respect to index 72 and turning the handwheel to maintain index 68 at its previous azimuth setting. Other ways of using the deflection set will be obvious to those skilled in the art.

In Figures 9 to 12, inclusive, I have shown a third modification in which deflection may be set by reference to either of a pair of right and left deflection registers. In these figures, 6" represents a portion of the sight casing corresponding to 6, Figure 3, and 6', Figure 7. A housing 74 is shown, for simplicity of illustration, as integral with wall 6". A bearing standard 75 is attached to the inner surface of the rear wall of housing 74 as by cap screws, one of which is identified at 76.

Shaft 15", corresponding to 15, Figure 2, and 15', Figure 7, is journaled in aligned openings in standard 75 and the wall of casing 6" and has a gear 77 fixed upon its outer end. Housing 74 has an opening 78 in its vertical side wall. This opening is adapted to be closed by a cover plate 79 held in place by screws 80.

Figure 10:
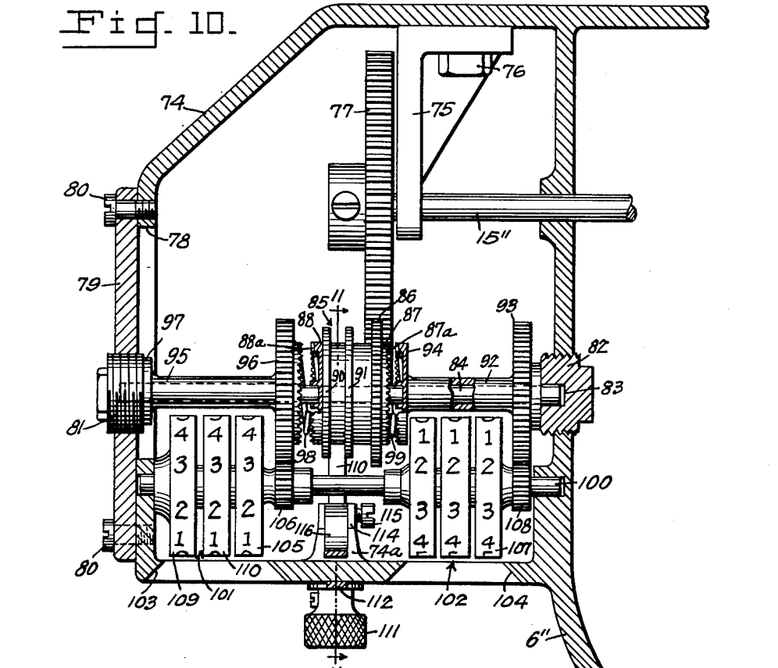
Figure 10 is a horizontal section taken substantially upon the line 10—10 of Figure 9, showing the selective drives to the respective deflection registers, including double-acting manually controlled clutch.

A plug 81 is threaded into an opening in plate 79. A second plug 82 is likewise threaded into an opening in the wall of casing 6". The plugs are in horizontal alignment and have axial bores, such as 83, cooperating to mount a shaft 84. A composite clutch and gear element 85 is freely journaled on shaft 84. As seen more clearly upon Figures 10 and 12, this element comprises a gear 86 having hubs 87 and 88 integral with its right and left faces, each hub being counterbored as at 89, Figure 12 for a purpose to be described. Hub 88 has spaced flanges 90 and 91 defining a channel therebetween. As seen in Figure 10, the gear 77 is of sufficient width so that it is at all times in mesh with gear 86 for all axial positions of the latter along shaft 84. The end rims of hubs 87 and 88 are provided with relatively fine radial clutch teeth 87a and 88a.

A sleeve 92 is journaled on the right end of shaft 84. This sleeve has a gear 93 and a clutch element or cup 94 secured at its right and left ends, respectively, as seen upon Figure 10. The outer face of gear 93 bears against plug 82 so that sleeve 92 may be given a slight axial adjustment by rotation of the plug. The cup 94 has radial clutch teeth confronting those on hub 87 and adapted to be engaged thereby on axial shift of element 85 to the right.

A sleeve 95 is journaled upon the left end of shaft 84 and has a gear 96 and flange 97 affixed on its right and left ends, respectively. Gear 96 has its face formed with radial clutch teeth adapted to be engaged by those on hub 88 on leftward shift of element 85. Flange 97 contacts plug 81. Adjustment of the sleeve axially may thereby be effected by turning the plug. A light coil spring 98 may be interposed between the confronting clutch teeth on gear 96 and hub 88 to urge them apart. Likewise an identical spring 99 may be interposed between the clutch teeth on cup 94 and hub 87. These springs seat within counterbores in the cup 94, element 85 and gear 96, and act to keep the sleeves 92 in their desired end positions, as well as to urge element 85 to centralized free position although, as will later appear, they are not wholly necessary for this latter purpose.

A shaft 100 is mounted within aligned bores in wall 6" and housing 74, in parallel relation with shaft 84. Two sets of registering drums, generally identified at 101 and 102 are mounted upon this shaft and are viewable through windows 103 and 104 in the front housing wall. See Figures 9 and 10. Of the set 101, the units drum 105, has a pinion 106 in mesh with and driven by gear 96. Likewise the units drum 107 has a pinion 108 driven by gear 93. Each set of drums is interconnected by mechanism for advancing them in timed relation. That is, for example, hundreds drum 109 of set 101, is advanced $\frac{1}{10}$ of a complete rotation for each rotation of tens drum 110; and the latter is advanced $\frac{1}{10}$ of a rotation for each complete rotation of units drum 105. Each register is also provided with means to yieldingly hold each drum in set position as well as resetting means. Since there are numerous well known means for effecting such functions, they have not been shown in detail. The interconnecting and advancing means may be the same as shown in the species of Figures 1 to 6. At Figure 9 I have shown a knob 123 which is adapted to reset both registers 101 and 102. Thus, when pushed in and turned, this knob resets register 102, while when pulled out and turned it resets register 101 in a manner well known in the art.

Figure 11:
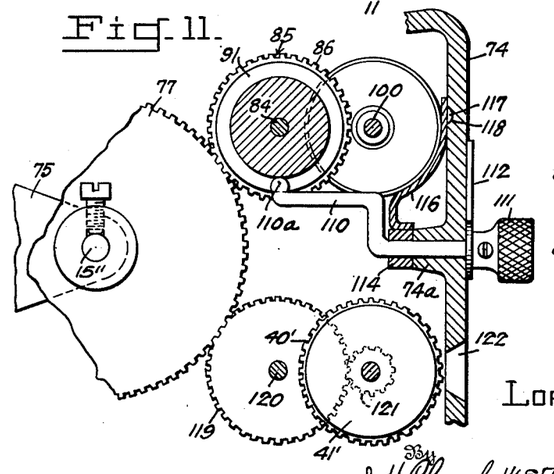
Figure 11 is a detail sectional view taken substantially upon the line 11—11, Figure 10, showing more particularly the clutch-operating mechanism.
Figure 12:
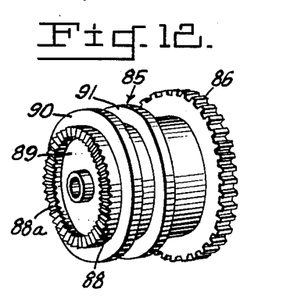
Figure 12 is a perspective detail view of the composite clutch and gear element of Figure 10.

As shown more clearly upon Figure 11, the front wall of housing 74 is provided with an internal horizontally-bored lug 74a within which is journaled a shifting lever 110 having a generally spherical end 110a having a smooth fit between flanges 90, 91 of element 85. A knob 111 is fixed to the exteriorly projecting end of lever 110 and carries a pointer 112 movable into registration with a selected one of three indicia 113. Thus as knob 111 is turned to move pointer 112 from "O" to "L", element 85 is shifted along shaft 84 to bring clutch teeth on hub 88 into engagement with those on gear 96. Shaft 15" is thus connected with register 101 and any turning of the shaft is indicated by that register. Likewise, when knob 111 is turned to move pointer 112 from "O" to "R", element 85 is moved to the right to engage its clutch teeth with those on cup 94, thus coupling shaft 15" with register 102. Because of the fact that the drums of register 101 are graduated in the opposite direction from those of register 102, turning of shaft 15" clockwise as viewed from its right end, Figure 10, advances the indications of register 102 from "000" in consecutive numerical order when element 85 is shifted to the right. When element 85 is shifted to the left, turning of shaft 15" counterclockwise advances the indications of register 101 from "000" in consecutive numerical order. Deflection adjustments from 0 to 1000 mils, left and right, are thus possible.

Lever 110 has a collar 114 fixed thereon by a set screw 115. A leaf spring 116 is fixed to this collar and has a nib 117 on its end adapted to snap into one of three depressions 118 formed in wall 74, as pointer 112 moves from "O" to "L" or "R". The resilience of spring 116 thus acts yieldingly to maintain lever 110 and element 85 in their adjusted positions. Positive engagement of the teeth of element 85 with those of gear 96 or cup 94 may be assured by slight adjustments of plugs 81 and 83. By loosening set screw 115 knob 111 may be turned to centralize element 85 after which the screw is tightened.

The azimuth register and drive thereto from shaft 15" may be substantially the same as in Figures 1 to 6 so that detailed description thereof is unnecessary. It will be sufficient to point out that, referring to Figure 11, gear 77 meshes with and drives an idler 119 mounted upon shaft 120, Idler 119 meshes with a pinion 121 corresponding to pinion 35, Figure 3, and attached to a units drum 34', Figure 9. The aforesaid units drum for each complete rotation, advances tens drum 41' by $\frac{1}{10}$ rotation about 40'. The azimuth registering wheels, including hundreds wheel 48' are viewed through a window 122, in wall 74. All are graduated and advanced in the manner previously described for the species of Figures 1 to 6. In all cases, the step-up ratio between shaft 15, 15' and 15'', and each of the units wheels driven thereby, is preferably, but not necessarily 10:1 whereby the angular rotation of the line of sight to the nearest mil is registered.

The use of the species of Figures 9-13 will be obvious from the foregoing description. When during firing, an order is received to deflect fire, say 150 mils to the right, knob 111 is turned to move pointer 112 to "R". The handwheel, as 21, Figure 1, is turned to advance register 102 from 000 to 150 thereby moving the line of sight by 150 mils. The gun and sight are then moved as a unit to restore the line of sight on the aiming point, thus moving the plane of fire 150 mils. The algebraic sum of the azimuth and deflection is, of course, at all times registered at window 122. When a new deflection setting is ordered, pointer 112 is moved to "O" and knob 123 is pushed in and turned to reset register 102 to zero. It is contemplated that a connection may be provided between knob 123 and lever 110 whereby pointer 112 and element 85 are automatically restored to centralized position when this knob is pushed in or pulled out. For example, when 112 is at "R" pushing knob 123 in will move 112 to "O" while when 112 is at "L" it will be moved to "O" by pulling out on knob 123. In this way the necessity for manually moving pointer 112 to "O" to centralize element 85, is obviated. Alternatively coil springs may be provided urging each of registers 101 and 102 to zero or centralized position, together with positive stop means at the zero position. Knob 123 may then be eliminated and either deflection register will be restored automatically to zero when pointer 112 is moved to "O" from "L" or "R".

Figures 13, 15:
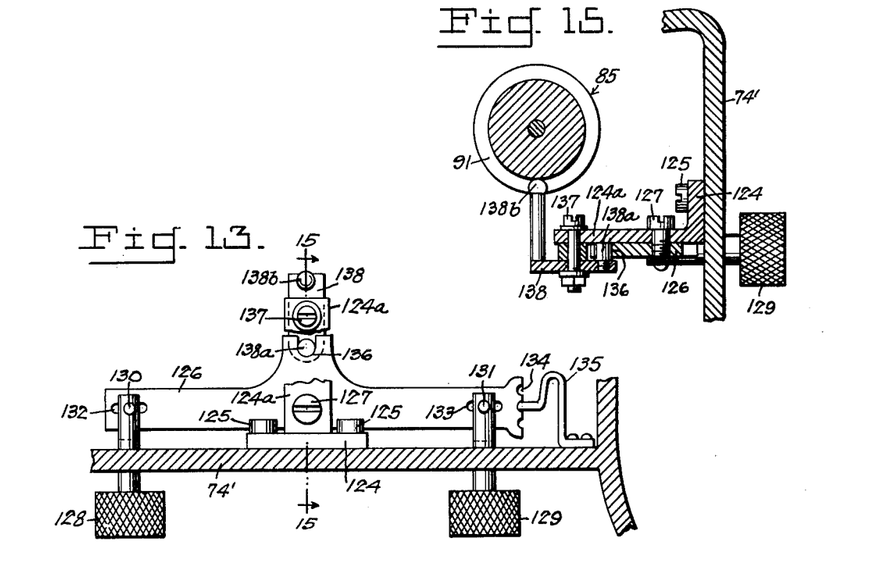
Figure 13 is a detail view of a modification of the clutch actuating mechanism of Figures 9–13.
Figure 15 is a section taken upon a plane indicated by line 15—15, Figure 13, showing details of the clutch-operating levers.
Figure 14:
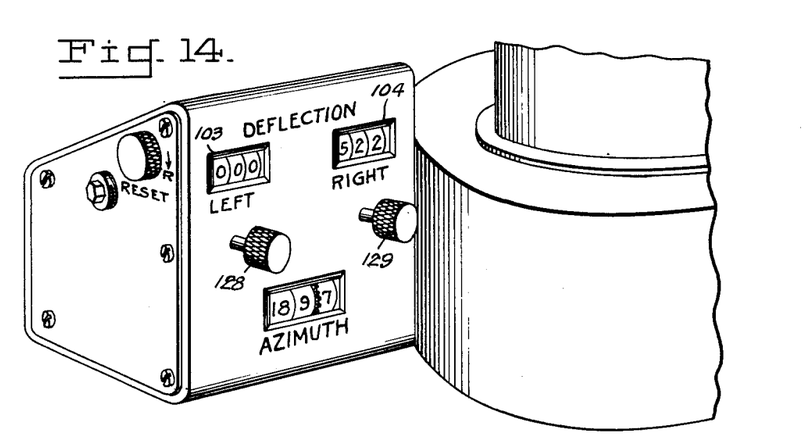
Figure 14 is a perspective view of the exterior of the register housing in a sight employing the modification of Figure 13.

At Figure 13 I have shown a modified form of mechanism for shifting clutch element 85. An "L" bracket 124 is attached by screws 125 to the inside of front wall 74'. A double-armed lever 126 is pivoted by screw 127 to the horizontal arm 124a. A pair of buttons 128 and 129 have stems slidably mounted in apertures through wall 74'. Each stem has its end horizontally slotted to embrace a respective end of lever 126. Pins 130 and 131 fixed in these ends, pass through respective slots 132 and 133 in the ends of lever 126. At one end, lever 126 has three spaced notches 134 adapted to engage the end of a spring 135 attached to the housing wall to thereby yieldingly hold lever 126 in a selected position. This lever has an offset portion provided with a notch 136. The extending arm 124a of bracket 124 has a second pin 137 on which is pivoted a short lever 138. A pin 138a fixed in one end of this lever fits notch 136 while the other end of 138 has an upward projection terminating in a ball 138b. This ball fits between flanges 90 and 91 of element 85, Figure 10. As shown at Figure 14 button 128 is located just below window 103 while button 129 is similarly located with respect to window 104. Thus, for example, when a left deflection is ordered, button 128 is pressed and ball 138b is thereby shifted to the left to correspondingly move the teeth of hub 88 and gear 96 into engagement and clutch shaft 15'' to register 101. At the same time, the end of spring 135 snaps into the upper notch 134 and holds lever 126 and element 85 in adjusted position until released by pressure upon button 129. Movement of element 85 is only a small fraction of an inch in either direction.

I have thus provided a combination of panoramic telescopic gun sight with azimuth and deflection registers, which is highly accurate, relatively simple to construct, and very easy to learn to use. At the same time all possibility of error in reading the actual azimuth or deflection angles is eliminated. The species of Figures 9-14 are particularly useful in that deflections may be set without any substantial movement of the gunner's head.

While I have shown a preferred embodiment of the invention, together with several modifications thereof, numerous changes and substitutions are possible without departing from the basic idea upon which the invention is founded. These changes will readily occur to those skilled in the art after a study of the present disclosure. Thus, I wish the disclosure to be taken in an illustrative rather than a limiting sense, and to reserve all changes as fall within the scope of the subjoined claims.

Having now fully disclosed the invention what I claim and desire to secure by Letters Patent is:

1. A sight for guns including a frame having a normally vertical axis, an eyepiece carried by said frame in normally horizontal fixed relation relatively to said frame, a sighting head mounted on said frame for rotation relatively thereto about said axis, a first units drum, a second tens drum, said drums being of the same size and coaxially journaled on said frame, a third hundreds drum journaled on said frame on an axis parallel with, and of larger diameter than, said first and second drums, all said drums being tangent to a common plane and in adjacent, side-by-side relation, means concealing the indicia on said drums except for those at said plane, deflection indicating means separate from said drums and effective to indicate the magnitude and direction of a desired deflection setting, and manually operable means connecting said sighting head, said drums and said deflection indicating means for rotation in timed relation.

2. In a panoramic sight for use in controlling the fire of guns, a vertical telescope tube having at one end thereof an eyepiece assembly and at the other end thereof a rotatable head assembly, a housing surrounding said tube and containing manually operable means including a shaft effective to rotate said head assembly, said housing having an indicator unit, said shaft extending through said housing and into said unit, first indicating means within said unit operably connected to said shaft and comprising a plurality of interconnected dials each having consecutive digits upon its periphery, said digits collectively forming a number representative of the angular position of said head assembly about the tube axis, second indicating means within said unit also operably connected to said shaft and effective to give a deflection setting separate from the angular position indication obtained from said first indicating means.

3. In a panoramic sight, a housing adapted to be mounted upon a gun, a head journaled on said housing and rotatable about a normally vertical axis to correspondingly rotate in azimuth the line of sight, a plurality of coacting registering dials journaled in said housing, means driving said dials in timed relation with said head to conjointly register a series of digits forming a number giving in mils the rotation of head from a predetermined position, a deflection dial journaled in said housing adjacent a viewing opening therein, a deflection ring concentric of said dial, means mounting said ring for rotation about said dial, cooperating mil graduations and an index on said deflecting ring and dial, and means rotating said deflection dial in timed relation with said head.

4. A panoramic sight as in claim 3, said ring being graduated in mils, said index being on said dial and movable in indicating relation with said graduations, and means operable to fix said ring in a desired position of rotative adjustment.

5. In a gun sight, a housing adapted to be carried by said gun, an optical head rotatable on said housing about a normally vertical axis to thereby rotate the line of sight about said axis, spaced, parallel, first, second and third shafts mounted in said housing, first and second register drums journaled coaxially with and operated by said first shaft, a third registering drum journaled upon said second shaft, all said drums being tangent to a common plane adjacent a viewing opening in said housing, a composite gear and deflection index journaled on said second shaft, said index being observable at a window in said housing wall, means including a gear on said second shaft for driving said drums from and in timed relation with said third shaft, a gear fixed on said third shaft and meshing with said composite gear, and means rotating said head in response to and in timed relation with rotation of said third shaft.

6. In a gun sight according to claim 5, said housing having a circular threaded outstanding rim surrounding said window, said rim having an internal shoulder concentric of said second shaft, a graduated deflection ring seated on said shoulder, and a clamping ring threaded on said rim and effective when turned down to clamp said ring in its position of rotative adjustment.

7. In a gun sight, a housing adapted to be attached to a gun, a sighting head on said housing and adjustable about a normally vertical axis to thereby adjust the line of sight in azimuth, a first azimuth register in said housing, a second right deflection register in said housing, a third left deflection register in said housing, first means coupling said head for rotation in timed relation with said first register, and manually operable clutch means operable selectively to couple said second or said third registers with said first means.

8. A gun sight comprising a housing adapted for mounting upon a gun, a sight head mounted on said housing for adjustment about a predetermined axis to thereby angularly adjust the line of sight about said axis, a first azimuth register, and second and third deflection registers mounted in said housing and viewable through openings in a wall thereof, each said register comprising a set of drums mounted in side-by-side relation together with means for advancing successive drums of each set in timed relation, a first gear journaled in said housing, means connecting said gear and azimuth register for operation in timed relation, a shaft mounted in said housing, first and second elements journaled on said shaft, each said element comprising a gear and radial clutch teeth, said teeth being in spaced confronting relation, a third clutch element journaled on said shaft between said first and second elements and comprising a second gear in mesh with said first gear and sets of clutch teeth adapted to mesh alternatively with the teeth of said elements on axial sliding of said clutch element, a pinion secured to the units drum of each of said second and third registers and in mesh with the gear of a respective one of said first and second elements, means mounted exteriorly on said housing and manually operable to axially shift said clutch element, and means connecting said head and first gear for rotation in timed relation.

9. The combination as recited in claim 8, said manually operable means comprising a second shaft passing through and journaled in said housing and having an offset end engageable in an annular channel in said clutch element, a collar on said second shaft, means securing said collar to said second shaft, a spring fixed to said collar and adapted to yieldingly engage any one of three recesses in said housing wall, and a knob and indicator on said shaft exteriorly of said housing.

10. The combination as recited in claim 8, said manually operable means comprising a double armed lever pivoted on the inner wall of said housing, a pair of buttons slidably mounted in said wall each engaging a respective end of said lever to pivot the same in respectively opposite directions, means connecting said lever and clutch element to slide the latter in response to pivoting of said lever, and spring means carried by said housing wall and engaging said lever to yieldingly hold the same in pivoted position.

11. In a gun sight, a housing adapted to be mounted upon a gun, a sighting head rotatable on said housing about a normally vertical axis, an azimuth register, a right deflection register, a left deflection register, said right and left deflection registers each comprising a plurality of interconnected drums mounted in side-by-side relation and having consecutive digits thereon, rotating means connecting said sighting head and said azimuth register, two-way clutch means, and manually controllable means to alternatively and selectively connect said right or left deflection register to said rotating means through said clutch means, and means mounting all said registers for observation in a common field of view.

LORRIN A. RIGGS.

REFERENCES CITED

The following references are of record in the file of this patent:

UNITED STATES PATENTS

| Number | Name | Date |
|---|---|---|
| 211,968 | Capek | Feb. 4, 1879 |
| 441,301 | Hamrich | Nov. 25, 1890 |
| 517,746 | Grenfell | Apr. 3, 1894 |
| 873,228 | Hahn | Dec. 10, 1907 |
| 1,209,958 | Graul | Dec. 26, 1916 |
| 1,439,904 | Lockwood | Dec. 26, 1922 |
| 1,460,627 | Weaver | July 3, 1923 |
| 1,700,292 | Kreevoy | Jan. 29, 1929 |
| 2,145,347 | Everitt | Jan. 31, 1939 |
| 2,243,100 | Kennedy | May 27, 1941 |
| 2,266,741 | Crane et al. | Dec. 23, 1941 |
| 2,390,613 | Oliphant | Dec. 11, 1945 |
| 2,448,965 | Drayer | Sept. 7, 1948 |

FOREIGN PATENTS

| Number | Country | Date |
|---|---|---|
| 308,497 | Germany | May 9, 1921 |
| 367,424 | Italy | Jan. 24, 1939 |